REEL CONTROL SYSTEM FOR MANGETIC TAPE APPARATUS 3,664,604

REEL CONTROL SYSTEM FOR MAGNETIC TAPE APPARATUS

Jesse I. Aweida and William C. Arthur, Boulder, and Gale A. Powers, Longmont, Colo., assignor to Storage Technology Corporation, Boulder, Colo.

Filed Jan. 27, 1970, Ser. No. 6,181
Int. Cl. G11b *15/06, 15/58, 23/12*
U.S. Cl. 242—185 10 Claims

ABSTRACT OF THE DISCLOSURE

In magnetic tape handling apparatus, diaphragm operated switches in the slack tape vacuum column are connected to produce a continuous error signal applied to the reel motor. When the capstan drive is in a direction taking tape out of the column, the tape loop is positioned about an upper null point. When the tape loop moves above this upper null point, an error signal, linear with loop position, is applied to drive the reel motor. In a zone below the upper null point the reel coasts. When the capstan drives the tape in a direction which puts tape into the column, the tape loop is positioned at a lower null point. Below the lower null point an error signal which is linear with tape loop position is applied to drive the reel motor. When the tape loop is in a zone above the lower null point, the reel coasts. Between the two coasting zones, dynamic breaking is applied to the reel motor.

BACKGROUND OF THE INVENTION

This invention relates to magnetic tape handling apparatus and more particularly to a control system for the reel motor.

High performance magnetic tape units are extensively used in digital systems. One example of a high performance magnetic tape unit is the IBM 2420 Model 5 magnetic tape unit described in the IBM System Reference Library Bulletin file No. S/360/05. Units such as this include a file reel, a machine reel and a capstan for driving the magnetic tape past the heads and between the file reel and the machine reel.

In order to minimize the length (mass) of the tape to be accelerated by the capstan, slack tape vacuum columns are provided on each side of the heads. The drive for the reel motors is controlled by vacuum actuated switches in the columns. When the capstan is driving the tape in a direction which is taking tape out of a column the tape loop is positioned around an upper null point in the column. When the tape direction is in a direction such that tape is being fed into the column, the loop in the tape is positioned about a lower null point. Vacuum switches are positioned above and below each of the null points to reverse the direction of the reel motor when the tape loop deviates from its null position.

In general, the control system for the reel motors in the prior art respond to vacuum switch actuation in on-off or "bang-bang" control. Both AC type reel motors and DC type reel motors have been used. Generally, as tape speeds increase for greater data handling, the torque requirements increase, thus making the DC reel motors more suitable for use. Prior art control systems apply the full motor voltage available from a DC supply to the motor. When the tape position is corrected to a position where an error signal is not present, the control system applies no motor voltage at all. This type of on-off control has the advantage of a fast response time but has the disadvantage of having a very large overshoot in position.

SUMMARY OF THE INVENTION

In accordance with an important aspect of the present invention, a series of diaphragm actuated vacuum switches are included in each vacuum column. This series of switches is connected to the control circuit to provide continuous sensing of the position of the tape loop in the column.

In accordance with another important aspect of this invention, the error signal derived from the switches is shaped so that it increases linearly with tape position as the tape loop moves above the upper null point and as the tape loop moves below the lower null point. Between the null points the error signal is clamped to reference potential which provides no drive to the reel motor. Because of this, the reel motor coasts in a small zone below the upper null point and above the lower null point. The alternate coast-to-drive-to-coast type of control around the null point has several advantages over driving in both directions around the null. It is less wasteful of power and less likely to cause oscillatory reel speed. Further, it does not require a null detector to switch the motor drive circuit from the forward to the reverse direction.

In accordance with another important aspect of this invention, the velocity, as well as position, of the tape loop is sensed to provide even closer control of the reel motor speed. It is desirable to have the maximum reel linear speed approximately 10 percent greater than capstan speed. When this condition exists, overshoots are minimized and a shorter vacuum column can be used thereby saving space.

In accordance with another aspect of this invention, the reel control amplifier is of the proportional type which produces a DC motor voltage in proportion to the error in tape loop position. This gives a moderately fast response time, minimal overshoot and a small steady state position error.

DESCRIPTION OF A PARTICULAR EMBODIMENT

Figure 1:
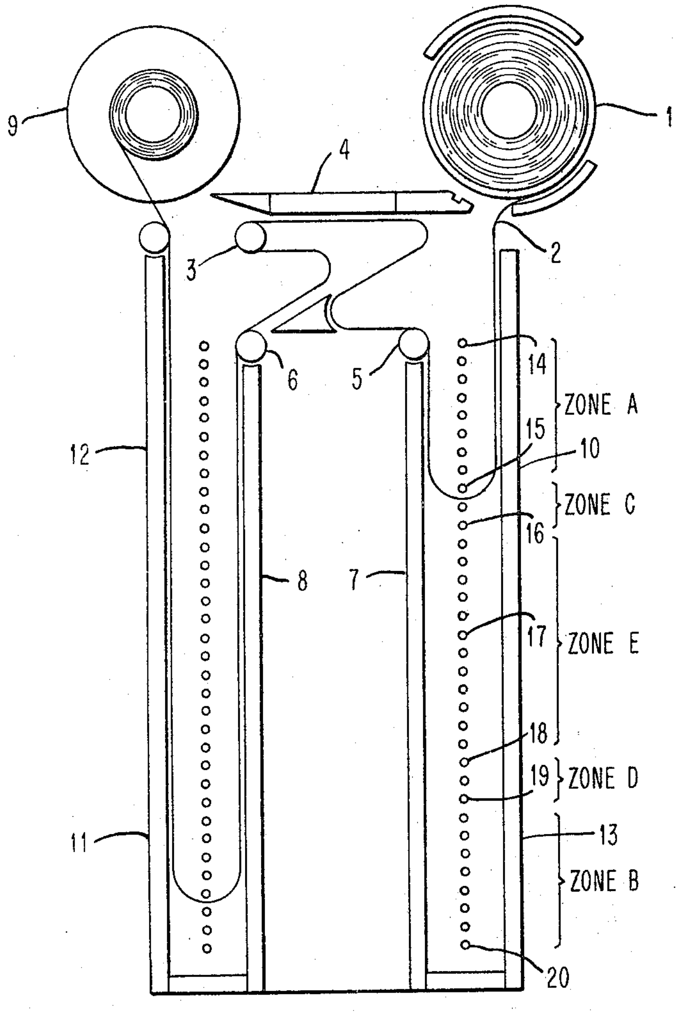
FIG. 1 is an elevation which shows the tape handling apparatus.

This invention relates to high performance magnetic tape drives of the type shown in FIG. 1 wherein a file reel 1 contains the magnetic tape 2. A single drive capstan 3 moves tape forward or backward past the magnetic heads 4. Air bearings 5 and 6 reduce wear and friction within the tape path. Vacuum columns 7 and 8 greatly reduce the length of tape to be accelerated by the capstan thereby providing smooth and rapid start-stop motion. The tape is wound onto a machine reel 9.

When the tape motion is from the file reel 1 to the machine reel 9, it is desirable to maintain the loop of tape in the column 7 at approximately the upper null point 10 and the loop of tape in the column 8 at approximately the lower null point 11. The reason is that the capstan 3 reverses the tape direction quite quickly. On the other hand, the file reel 1 has large inertia and will reverse direction more slowly. Under this condition both the capstan 3 and the file reel 1 will be supplying tape into the column 7. By maintaining the tape loop at the upper null point 10, there is more room in the column to accept tape upon reversal without the tape bottoming out in the column. Similarly, by maintaining the tape loop in column 8 at the lower null point 11, there is more room for reversal without the tape coming out of the top of the column.

When the tape motion is from the machine reel 9 to the file reel 1, it is desirable to have the tape loop in column 8 at the upper null point 12 and the tape loop in the column 7 at the lower null position 13.

The position of the tape loop in the column is determined from a series of elastic diaphragm switches which are actuated by the change in pressure from column vacuum to atmospheric pressure as the tape loop passes over the switch. These switches are actuated through air ports in the column. The column 7 includes the air ports 14–20 together with intermediate ports which have been shown but not numbered. The column 8 includes a similar number of ports.

In accordance with an important aspects of this invention, the position of the tape in the column is continuously sensed by this series of switches. The control of the drive of the file reel 1 depends upon the position of the tape in the column. For convenience of reference, the portion of the column between the ports 14 and 15 has been denoted zone A, the portion between ports 15 and 16 Zone C, the portion between ports 16 and 18 Zone E, the portion between ports 18 and 19 Zone D and the portion between ports 19 and 20 Zone B.

Briefly, when the tape loop is being maintained at the upper null point, travel of the tape into Zone A produces an error signal which increases linearly as the tape moves above the null point. In Zone B the error signal is clamped to reference potential so that the reel coasts. The control is alternately from drive to coast to drive as the tape loop moves about the upper null point. Similarly, when the tape loop is being maintained at the lower null point an error signal linearly proportional to tape position is produced in Zone B. The motor coasts in Zone D. In Zone E dynamic braking is applied to the reel motor.

Figure 2:
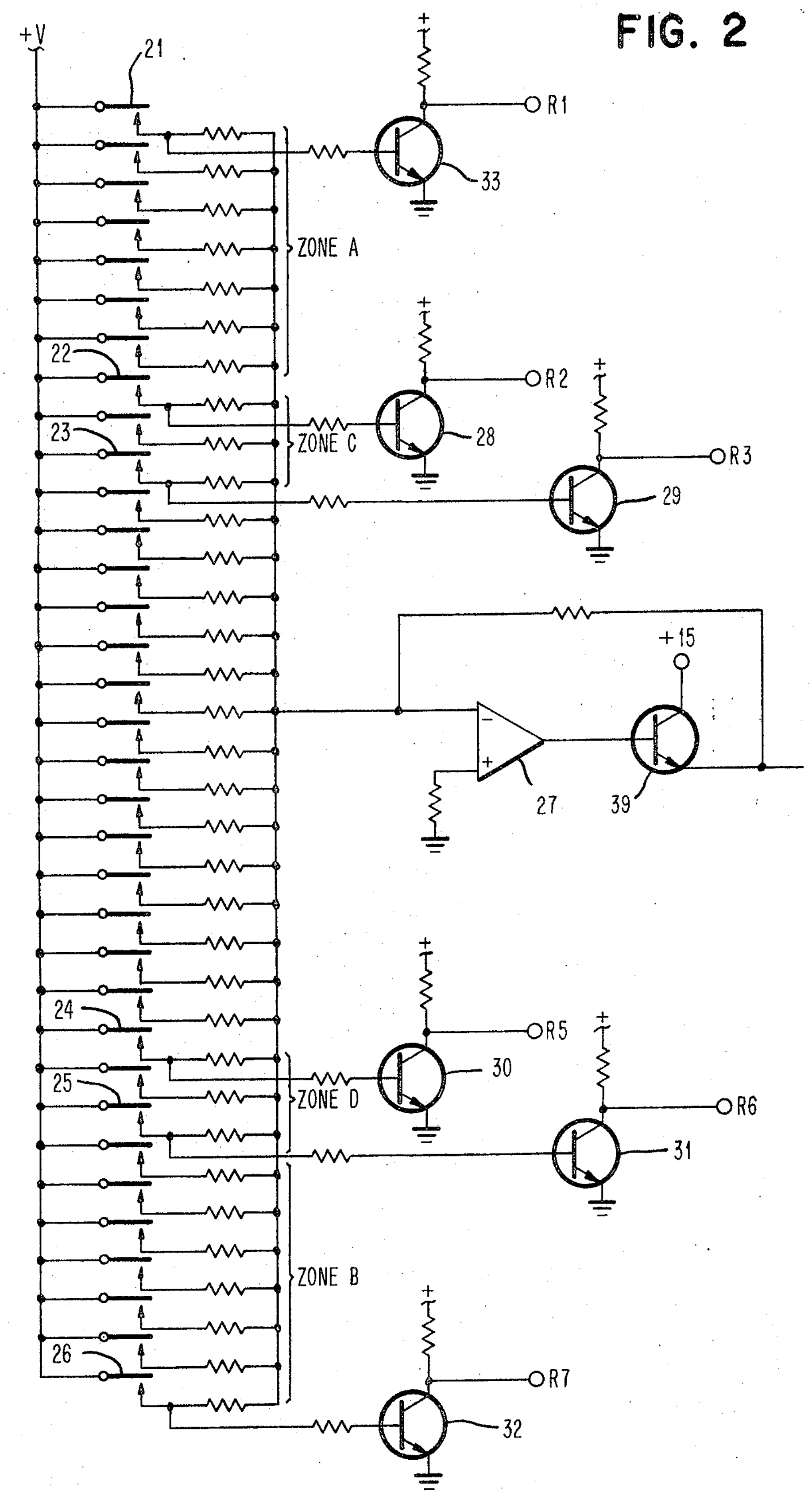
FIG. 2 is a schematic diagram which shows a portion of the control circuit which includes the diaphragm switches.
Figure 3:
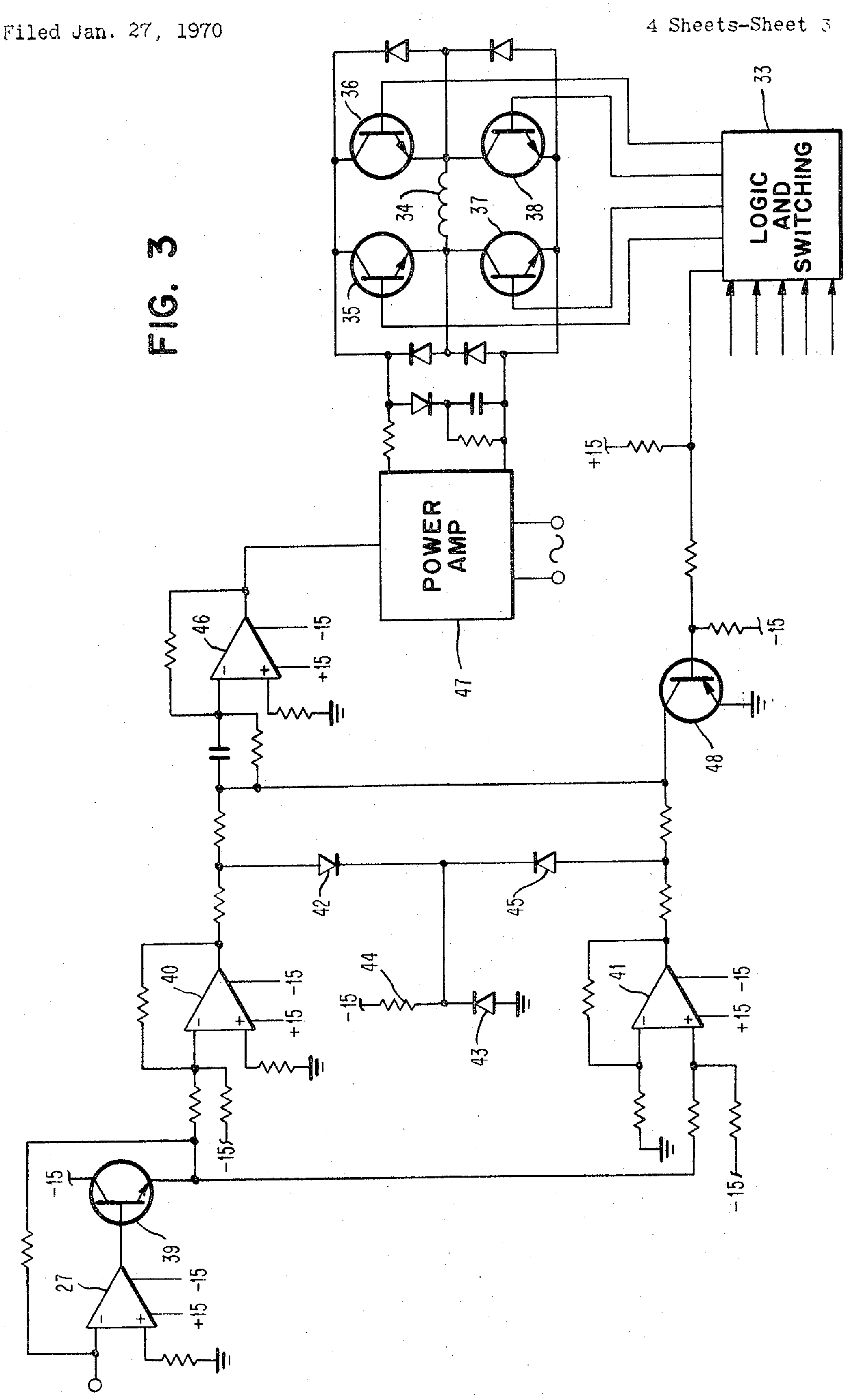
FIG. 3 is a schematic diagram which shows another portion of the circuitry of the control system.

The control circuitry is shown in FIGS. 2 and 3. In FIG. 2 switches 21–26 have been denoted with reference numerals and other intermediate switches have been shown. The switches 21–26 are actuated by the ports 14–16 and 18–20 respectively. (FIG. 1.) The switches include a mylar diaphragm connected to a voltage source. All of the switches below the tape loop are closed by the vacuum in the column. As the tape loop moves up in the column, more switches are closed thereby supplying an increasing current to the operational amplifier 27.

In order to sense which zone of the column the tape loop is in, the transistors 28–32 are connected to switches at the boundaries of the zones. The outputs of these transistors are connected to logic and switching circuitry indicated at 33. Briefly, the switching of the drive current to the motor armature 34 is as follows.

The direction of current flow in the armature 34 is controlled by the transistors 35–38 connected in a conventional H arrangement. When the tape is being driven in one direction, the transistors 36 and 37 are turned on; the transistors 35 and 38 are turned on to provide motor drive in the opposite direction. In dynamic braking the transistors 37 and 38 are turned on. When the tape loop goes above the upper limit of Zone A, as detected by closure of switch 21, capstan drive is terminated to prevent the tape from coming out of the column. Similarly, when the tape loop goes below the bottom of Zone B, as detected by opening of switch 26, FIG. 2, capstan drive is terminated to prevent the tape from bottoming out in the column.

Figure 4:
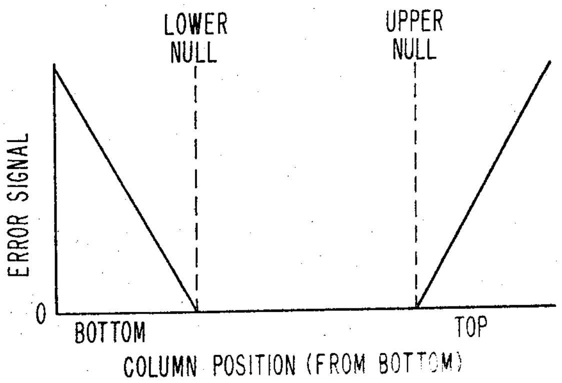
FIG. 4 is a diagram showing the waveform of the error signal.

In accordance with an important aspect of this invention, it is not necessary to provide switching around the null point. Rather, the error signal applied to the power amplifier is shaped so it increases linearly as the tape position moves above the upper null point or below the lower null point. For tape positions between the null points the error signal is clamped to reference potential. The error signal applied to the power amplifier is shown in FIG. 4. The circuitry which produces this error signal is shown in FIG. 3 and operates as follows.

The voltage from the output of amplifier 27 ranges from 0 to −15 volts depending upon the position of the tape loop. This voltage is applied to the base of the emitter follower 39. The signal on the emitter is applied to a second operational amplifier 40 and a third operational amplifier 41. Amplifier 41 is effective above the upper null point. The bias on the amplifier 41 is such that the output goes negative, below ground potential, only as the tape loop moves above the upper null point. As the tape loop goes below the upper null point, the output of amplifier 41 tends to go positive, that is, above ground potential. However, the output of amplifier 41 is clamped so that it cannot go above ground potential. The clamping circuit includes the diodes 43 and 45 and the resistor 44.

Similarly, the amplifier 40 is effective when the tape loop position is below the lower null point. The bias is such that when the loop position is above the lower null point the output of amplifier 40 tends to go positive. However, it is clamped through the diode 42 so that the output cannot go positive. However, as the tape loop goes below the lower null point the output of amplifier 40 goes negative.

The outputs of amplifiers 40 and 41 are coupled together to the input of an inverting amplifier 46. After inversion, the error signal is of the form shown in FIG. 4. This error signal is applied to the power amplifier 47 which drives the motor armature through the switching transistors 35–38.

Transistor 48 is employed to force the position error voltage to zero volts during switching of the H. This reduces the transistor collector voltage to a value proportional to the motor back E.M.F. and results in lower transistor power dissipation during the critical period in which switching occurs.

Figure 5:
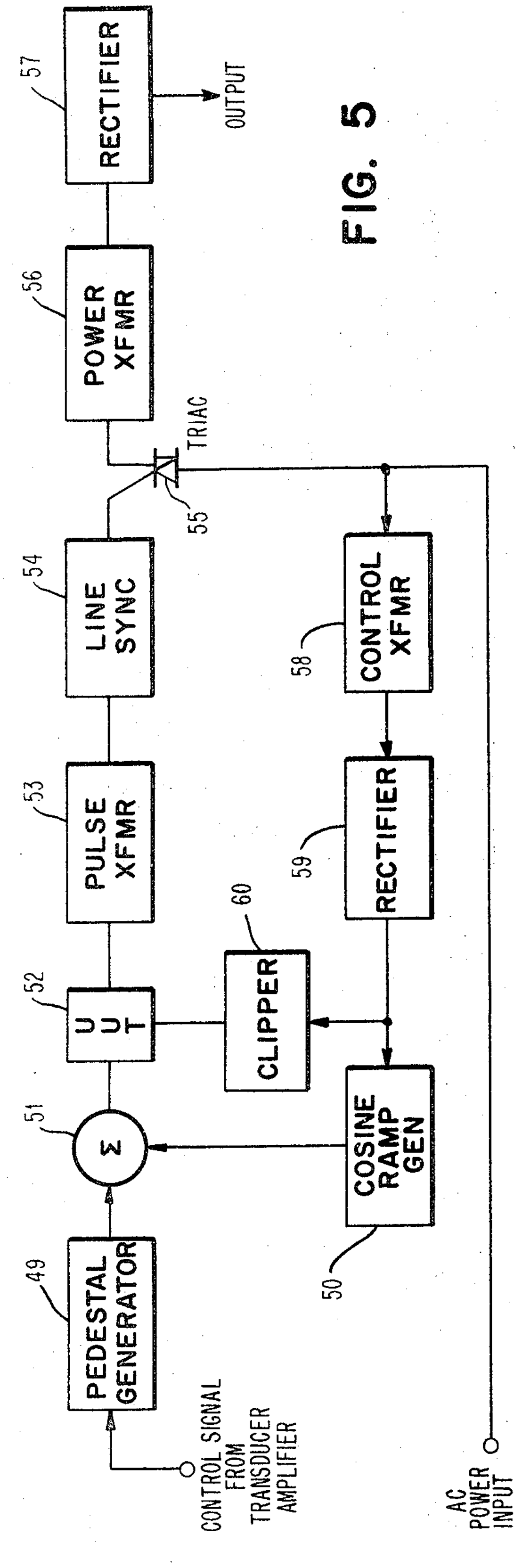
FIG. 5 is a schematic diagram which shows the power amplifier in more detail.

The power amplifier is shown in FIG. 5. The function of the power amplifier is to produce a high power level DC output voltage which is directly proportional to the DC error signal from the amplifiers in FIG. 3. The amplifier controls the magnitude of the DC output by controlling the portion of the voltage half cycle during which a triac device is conducting.

A pedestal generator 49 generates a constant voltage pedestal each half cycle. The height of this pedestal is proportional to the amplitude of the error signal. A time varying cosine ramp, generated by ramp generator 50, is combined with the pedestal in the summer 51. The cosine ramp is synchronized with line frequency. The unijunction transistor 52 fires each time the AC input voltage goes to zero. The line synchronization reduces the voltage on the emitter of unijunction transistor to a low but known value each time the AC input voltage goes to zero. This allows the modified cosine ramp voltage to start at a voltage level determined solely by the pedestal generator voltage. With a high pedestal input, the unijunction transistor will fire much earlier in the half cycle than with a low pedestal voltage.

Each time the unijunction transistor 52 fires, a pulse is generated which is fed through pulse transformer 53 and the line synchronized 54 to the gate of the triac device 55. (A triac is a thyratron-like device and consists essentially of back-to-back silicon-controlled rectifiers which will conduct current in either direction upon being fired.)

For the remainder of the half cycle, until the AC input voltage passes through zero, the triac remains gated on. The line synchronizer 54 retriggers the triac 55 if the current flowing through the triac should pass through zero before the end of the voltage half cycle. Since the transformer is an inductive load in which the current can lag the AC line voltage by a considerable phase angle, this retriggering is sometimes necessary.

The phase controlled AC voltage is applied to the primary of the power transformer 56. Power transformer 56 isolates the DC output from the AC input and provides a suitable stepdown/stepup ratio to provide proper reel motor operating range. The secondary of power transformed 56 is applied to the rectifiers 57 to be converted to a full rectified sine wave output.

In order to synchronize the cosine ramp with the line frequency, the AC power input is applied through control transformer 58, rectifier 59 and clipper 60 to the unijunction transistor 52. The output of rectifier 59 is also applied to the cosine ramp generator 50 for synchronization.

This type of amplifier has the advantage of controlling large amounts of power as demanded by the reel motor yet dissipating very little power within itself. It has the added advantage over a silicon-controlled rectifier type of control in that the AC current itself will commutate the triac. Since the motor load is an inherently inductive load, silicon-controlled rectifiers used in the secondary must have special provisions to guarantee commutation. The use of capactive filtering to guarantee commutation has an adverse effect on the response time of the power amplifier.

Figure 6:
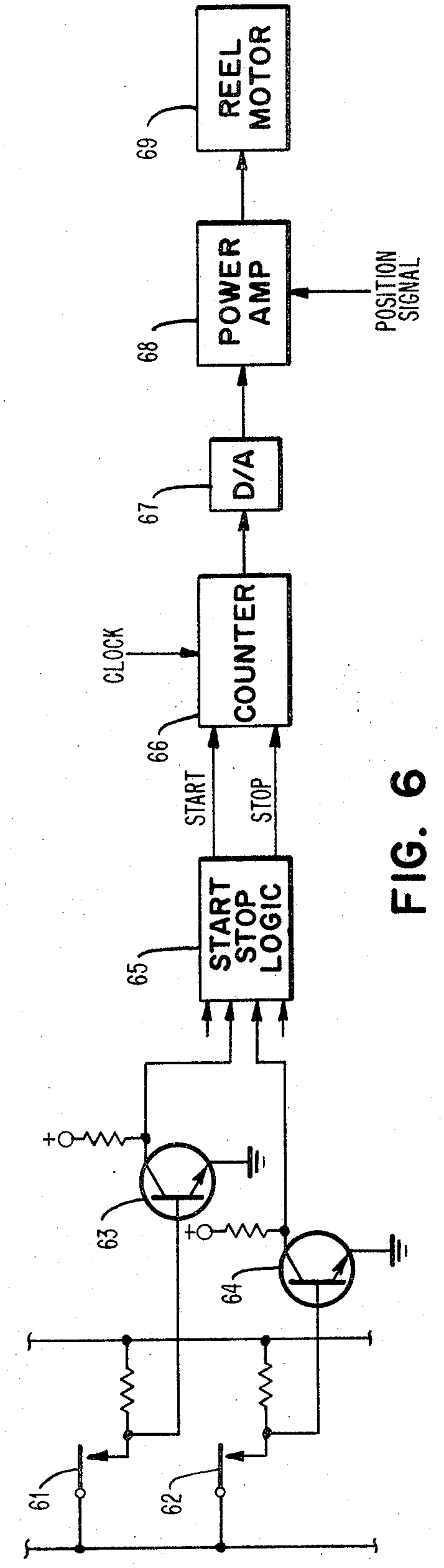
FIG. 6 is a schematic diagram which shows a modification for providing velocity feedback.

A modification of the invention is shown in FIG. 6. In order to closely control reel speed, it is desirable to sense tape loop velocity as well as tape loop position. FIG. 6 shows two of the diaphragm switches 61 and 62 which are connected through transistors 63 and 64 to the start-stop logic circuitry 65 for a counted 66. The counter 66 counts clock pulses during the time duration between the closure of the switches as the tape loop passes. As a result, the counter 66 contains a count which is inversely proportional to the speed of the loop as it passes the switches. This count is converted to an analog signal in the digital-to-analog converter 67. The analog velocity signal is combined with the position error signal, as determined from amplifier circuit of FIG. 3. The position signal and the velocity signal are combined in the power amplifier 68 to produce a control signal applied to reel motor 69 which will accurately control not only the position of the tape loop, but also the speed of the reel motor so that it is approximately 10 percent greater than capstan speed.

While particular embodiments have been shown and described, other modifications are within the scope of the invention.

What is claimed is:

1. In a tape handling machine including:
a file reel and a machine reel,
a drive motor for said file reel and a drive motor for said machine reel;
a magnetic head mounted intermediate said reels,
a capstan for driving said tape in both directions past said head and between said reels,
a pair of slack tape vacuum columns each having an open end disposed adjacent each of said reels on opposite sides of said head, and
a control system for each reel drive motor comprising:
tape loop position sensing switches spaced longitudinally in each column and actuated as the tape loop passes over each switch,
amplifier means for deriving a continuous error signal from the actuation of said switches, said error signal increasing linearly as the switches above an upper null point and below a lower null point in said columns are actuated, and
drive means for generating an output substantially proportional to said error signal, said output being applied to said drive motor to continuously control the drive of said motor in response to said error signal.

2. The tape handling apparatus recited in claim 1 wherein said amplifier means comprises:

a first amplifier, said switches being connected to the input of said first amplifier, the current to the input of said first amplifier being proportional to the number of switches actuated,
second and third ampliers, the output of said first amplifier being connected to the inputs of said second and third amplifiers,
means for biasing said second amplifier so that its output increases with respect to reference potential as the tape loop goes above said upper null point,
means for biasing said third amplifier so that the output increases above reference potential as said tape loop travels below said lower null point, and
means for clamping the outputs of said second and third amplifiers at reference potential, the outputs of said second and third amplifiers being connected together to produce an error signal which increases linearly above reference potential as said tape loop moves above said upper null and which increases linearly above reference potential as said tape loop moves below said lower reference potential.

3. The tape handling apparatus recited in claim 1 further comprising switching circuitry for applying drive current in either direction to said motor.

4. The tape handling apparatus recited in claim 3 wheren said switching circuitry includes means for switching said motor to a dynamic braking condition,
one of said switches below the upper null point and above the center of said column being connected to said switching circuit so that said motor is switched to dynamic braking when said tape loop travels below said one switch,
another of said switches above said lower null point and below the center of said column being connected to said switching circuitry so that said motor is switched to dynamic braking when said tape loop travels above the other switch, and so that said motor is in a coasting mode in a zone between said upper null point and said one switch and is in a coasting mode in a zone between said other switch and said lower null point.

5. The tape handling apparatus of claim 1 wherein said switches comprise elastic diaphragm switches actuated by the change in pressure from column vacuum to atmospheric pressure as the tape loop passes over each switch.

6. In a tape handling machine including:
a file reel and a machine reel,
a drive motor for said file reel and a drive motor for said machine reel;
a magnetic head mounted intermediate said reels,
a capstan for driving said tape in both directions past said head and between said reels,
a pair of slack tape vacuum columns each having an open end disposed adjacent each of said reels on opposite sides of said head, and
a control system for each reel drive motor comprising:
tape loop position sensing switches spaced longitudinally of each column and actuated as the tape loop passes over each switch,
amplifier means for deriving a continuous error signal from the actuation of said switches,
drive means for generating an output substantially proportional to said error signal, said output being applied to said drive motor to continuously control the drive of said said motor in response to said error signal,
means connected to said switches for sensing the speed of said tape loop as it passes over said switches, and
means for modifying said error signal in accordance with the velocity of said tape loop.

7. In a tape handling machine including:
a file reel and a machine reel, a DC drive motor for said file reel and a drive motor for said machine reel;

a magnetic head mounted intermediate said reels, a capstan for driving said tape in both directions past said head and between said reels, a pair of slack tape vacuum columns each having an open end disposed adjacent each of said reels on opposite sides of said head, and a control system for each reel drive motor comprising:

tape loop position sensing switches spaced longitudinally in each column and actuated as the tape loop passes over each switch;

amplifier means for deriving a continuous error signal from the actuation of said switches, and drive means including a power amplifier for generating an output DC motor voltage substantially proportional to said error signal, said output DC motor voltage being applied to said drive motor to continuously control the drive of said motor in response to said error signal.

8. The tape handling apparatus recited in claim 7 wherein said power amplifier comprises:

an AC power source, a pedestal generator which generates, during each half cycle, a voltage pedestal having an amplitude proportional to the amplitude of said error signal, a controlled rectifier device which can be controlled to conduct current during portions of a cycle of an alternating current applied thereto, said controlled rectifier device being connected in series with said AC power source, and means for combining said pedestal voltage with a ramp voltage to produce a signal which controls the time duration during each cycle that said rectifier device is conducting to produce a high power level DC output voltage which is directly proportional to said error signal.

9. An error signal amplifier system for tape handling apparatus of the type including:

a drive motor for the magnetic tape reel, a slack tape vacuum column having an open end disposed adjacent said reel vacuum actuated switches for sensing the position of the tape loop in said column, and a control system responsive to the position of said tape loop in said column for maintaining said tape loop at an upper null point, or at a lower null point, said error amplifier system comprising:

a first amplifier, said diaphragm switches being connected to the input of said first amplifier, the current to the input of said first amplifier being proportional to the number of switches closed, second and third amplifiers, the output of said first amplifier being connected to the inputs of said second and third amplifiers, means for biasing said second amplifier so that its output increases with respect to reference potential as the tape loop goes above said upper null point, means for biasing said third amplifier so that the output increases above reference potential as said tape loop travels below said lower null point, and means for clamping the outputs of said second and third amplifiers at reference potential, the outputs of said second and third amplifiers being connected together to produce an error signal which increases linearly above reference potential as said tape loop moves above said upper null and which increases linearly above reference potential as said tape loop moves below said lower reference potential.

10. The tape apparatus of claim 1 wherein said amplifier produces a constant error signal as the diaphram switches below the upper null point and above the lower null point are actuated.

References Cited

UNITED STATES PATENTS

| | | | |
|---|---|---|---|
| 3,122,332 | 2/1964 | Hughes, Jr. | 242—184 |
| 3,189,239 | 6/1965 | Brumbaugh | 242—182 X |
| 3,199,800 | 8/1965 | Reader | 242—184 |

LEONARD D. CHRISTIAN, Primary Examiner